(12) United States Patent
Barsness et al.

(10) Patent No.: US 7,693,988 B2
(45) Date of Patent: Apr. 6, 2010

(54) SUBJECT/OBSERVER UPDATE CONTROL METHOD AND APPARATUS

(75) Inventors: Raymond Severt Barsness, Winona, MN (US); Michael John Branson, Rochester, MN (US); Neela Patel, Rochester, MN (US); Andrew James Streit, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2114 days.

(21) Appl. No.: 09/801,309

(22) Filed: Mar. 7, 2001

(65) Prior Publication Data

US 2002/0129144 A1 Sep. 12, 2002

(51) Int. Cl.
*G06F 15/173* (2006.01)

(52) U.S. Cl. ....................................................... 709/225

(58) Field of Classification Search ................ 709/201, 709/203, 225
See application file for complete search history.

(56) References Cited

U.S. PATENT DOCUMENTS

| | | | | | |
|---|---|---|---|---|---|
| 4,750,135 | A | * | 6/1988 | Boilen | 709/231 |
| 5,764,899 | A | * | 6/1998 | Eggleston et al. | 709/203 |
| 5,963,951 | A | * | 10/1999 | Collins | 707/102 |
| 6,026,362 | A | * | 2/2000 | Kim et al. | 705/1 |
| 6,029,175 | A | * | 2/2000 | Chow et al. | 707/104.1 |
| 6,032,182 | A | * | 2/2000 | Mullen-Schultz | 709/223 |
| 6,061,681 | A | * | 5/2000 | Collins | 707/5 |
| 6,249,579 | B1 | * | 6/2001 | Bushnell | 379/356.01 |
| 6,424,989 | B1 | * | 7/2002 | Shaw et al. | 709/201 |
| 6,442,589 | B1 | * | 8/2002 | Takahashi et al. | 709/203 |
| 6,594,654 | B1 | * | 7/2003 | Salam et al. | 707/3 |
| 6,711,557 | B1 | * | 3/2004 | Palaniappan | 706/45 |
| 6,721,740 | B1 | * | 4/2004 | Skinner et al. | 707/10 |
| 6,850,923 | B1 | * | 2/2005 | Nakisa et al. | 706/47 |
| 6,851,105 | B1 | * | 2/2005 | Coad et al. | 717/106 |
| 6,880,086 | B2 | * | 4/2005 | Kidder et al. | 713/191 |
| 6,968,360 | B1 | * | 11/2005 | Morrow et al. | 709/206 |
| 7,263,597 | B2 | * | 8/2007 | Everdell et al. | 712/11 |
| 2002/0095465 | A1 | * | 7/2002 | Banks et al. | 709/206 |
| 2005/0004983 | A1 | * | 1/2005 | Boyd | 709/204 |
| 2005/0086211 | A1 | * | 4/2005 | Mayer | 707/3 |

OTHER PUBLICATIONS

Gamma et al., Design Patterns: Elements of Reusable Object-Oriented Software (Addison-Wesley 1995), pp. 293-303.

* cited by examiner

*Primary Examiner*—Vivek Srivastava
*Assistant Examiner*—Thomas Duong
(74) *Attorney, Agent, or Firm*—Grant A. Johnson

(57) ABSTRACT

A method and apparatus for maintaining data consistency between a subject and an observer. In one embodiment, an observer configures an aspect with a desired update type indicator, and then instructs the aspect to attach itself to a subject. The subject sends an update to the aspect when it changes state. The aspect interrogates the update, generates a update type indication, and selectively communicates an update based on a comparison between the desired type indication and the update type indicator. Some embodiments may also selectively modify and accumulate the update.

17 Claims, 3 Drawing Sheets

SUBJECT/OBSERVER UPDATE CONTROL METHOD AND APPARATUS

FIELD OF THE INVENTION

The present invention generally relates to data processing systems, such as computer systems, and the like. More particularly, the present invention relates to a method of maintaining data consistency between objects in which a plurality of observer objects are notified and updated automatically when a related subject object changes state.

BACKGROUND OF THE INVENTION

The development of the EDVAC computer system of 1948 is often cited as the beginning of the computer era. Since that time, computer systems have evolved into extremely complicated devices. To be sure, today's computers are more sophisticated than early systems such as the EDVAC. Fundamentally speaking, though, the most basic requirements levied upon computer systems have not changed. Now, as in the past, a computer system's job is to access, manipulate, and store information. This fact is true regardless of the type or vintage of computer system. Accordingly, computer system designers are constantly striving to improve the way in which a computer system deals with information.

Computer systems manipulate information by following a detailed set of instructions, commonly called a "program" or "software." Software development has traditionally been a time-consuming task. The field of software engineering has attempted to overcome the limitations of traditional techniques by proposing new, more efficient software development models. One such technique is called "object-oriented" programming. Programs created using this technique utilize self-contained items, known as "objects," which generally contain some information ("data") and a set of operations ("methods") capable of manipulating that data. These objects interact with each other by sending sets of instructions, called "messages."

In many object-oriented programs, some of the objects act as providers of services or functionality, whereas other objects act as consumers of services or functionalities. The providers of information or functionality are commonly known as "servers" or "subjects." The consumers of the information or functionality are called "clients" or "observers."

In conventional subject-observer systems, each subject maintained a list of observers and, when the subject's state changed, notified each observer of its state change. This notification occurred regardless of the observer's particular interest or the observer's capacity to handle the update. The observers would then request the updated information, again regardless of the observer's particular interest or the observer's capacity to handle the update. The subject's updates are then issued, only to be discarded by that observer. This drawback made conventional designs inflexible and inefficient.

This drawback is further magnified in modern "distributed" systems. These systems are made up of several independent computers connected by a communication device, such as a network or system bus, that work together to execute a program. Each computer in the system is capable of sending messages to the other computer, which allows objects existing on different computers to work together. Although this design allows the distributed system to perform tasks in parallel, its natural advantages are not fully utilized in conventional systems because the "remote" messages are comparatively slow. That is, when objects reside on different computer systems, the distributed system manager must send messages between those systems. These inter-system messages are sent at a much slower rate than intra-system messages. This drawback can make it computationally expensive to maintain data consistency across the distributed system.

An additional drawback with conventional subject/observer systems is that the subject object controls the message transmission rate. Frequently, an observer object running on a heavily burdened system may not be able handle updates from the subject object at this rate. This drawback can cause a bottleneck at one processor, which can cascade to other processors and cause them to cause them to become backed-up as well.

Yet another drawback of conventional design is that each subject frequently needs to simultaneously maintain several different types of relationships, and therefore to exchange different data for each type of relationship. In an effort to support these different relationships, conventional methods forced the subject object to support multiple attach/detach interfaces and to maintain multiple observer lists. This approach, however, was not extendable and frequently caused "code bloat."

Without a system that can optimize the use of system resources by minimizing remote calls and balancing workloads, data processing systems will never fully realize the benefits of distributed computing.

SUMMARY OF THE INVENTION

The present invention optimizes the use of system resources in data processing systems, such as computer systems, by introducing observer defined and controlled aspects into a subject/observer implementation. This provides an easily extendible mechanism that allows each individual observer to dynamically control what updates it wishes to be notified of from the subject, and how often it wishes to be notified of these updates by the subject. In one embodiment, the subject implements a set of attach/detach methods that enable an observer to register and de-register with the subject to be notified of subject state changes, and maintains the list of registered observers. The observer, in turn, implements an update method that enables the subject notification. When the subject state change occurs, the subject notifies each observer by calling the update method on each observer.

Accordingly, one facet of the present invention is a data processing system comprising a subject, an observer associated with the subject and adapted to generate configuration information, and a transmission manager associated with the subject. The transmission manager may be adapted to receive the configuration information from the observer and to selectively communicate update information to the observer based on the configuration information.

Another facet of the present invention is a distributed computer system comprising a subject code segment resident on a first computer node and an observer code segment resident on a second computer node, the first computer node being in operable communication with the second computer node. The subject code segment may be adapted to produce a status update message. This system may further comprise an aspect code segment coupled between the subject code segment and the observer code segment. The aspect code segment may be configured to detect information associated with a message and to selectively communicate the message from the subject code segment to the observer code segment based upon the detected information. This method may be also embodied on a computer useable medium as a computer program product.

Still another facet of the present invention is a method of communicating updates from a subject to an observer comprising sending configuration information from the observer to an aspect, notifying the aspect of an update; interrogating the update to generate update information, and selectively communicating the update to the observer based on a comparison between the update information and the configuration information. This method may further comprise selectively modifying the update based on a comparison between the update information and the configuration information, and accumulating the update information based on a comparison between the update information and the configuration information.

One feature and advantage of the present invention is that its aspect design pattern offers multiple, flexible, and extendible subject/observer relationships. These observer controlled relationships also easily facilitate filtering and throttling of updates while maintaining the desired data consistency. The benefits of these extensions are particularly desirable where communication costs are at a premium, such as in distributed systems and wireless systems. These and other features, aspects, and advantages will become better understood with reference to the following description, appended claims, and accompanying drawings.

DETAILED DESCRIPTION

Figure 1:
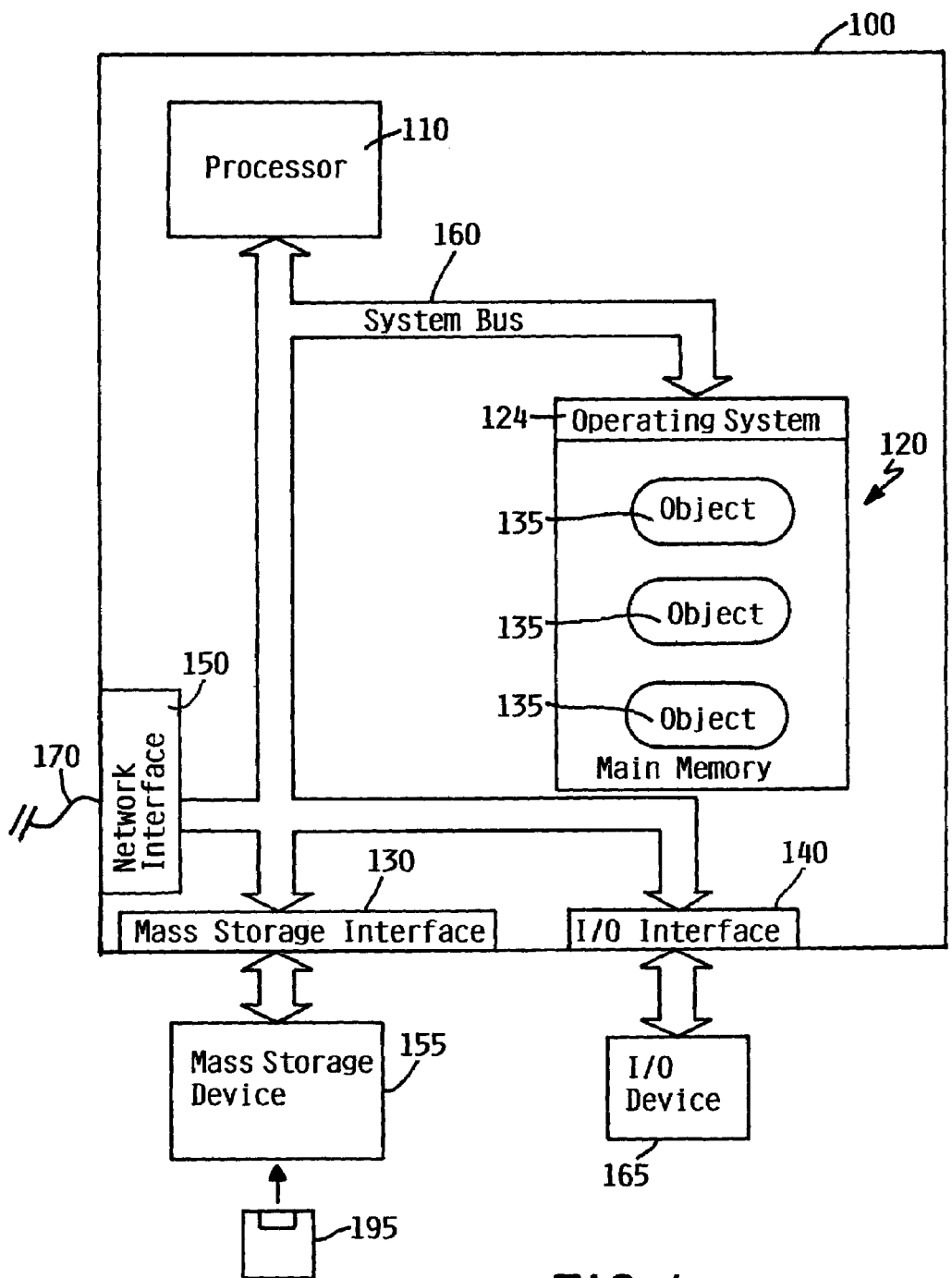
FIG. 1 is a schematic diagram of a computer system.

FIG. 1 depicts a computer embodiment 100 having a processor 110 connected to a main memory 120, a mass storage interface 130, an I/O interface 140, and a network interface 145 via a system bus 160. The mass storage interface 130 connects one or more mass storage devices 155, such as a hard disk drive, to the system bus 160. The input/output ("I/O") interface 140 connects one or more input/output devices 165, such as a keyboard, to the system bus 160. The network interface 150 connects the computer 100 to other computers 100 (not shown) over an appropriate communication device 170, such as the Internet.

The main memory 120 in this embodiment stores an operating system 124 and one or more objects 135. Each object 135 is an identifiable, encapsulated piece of software instructions and data that provides services upon request. These requests, in turn, are made by other objects 135.

Figure 2:
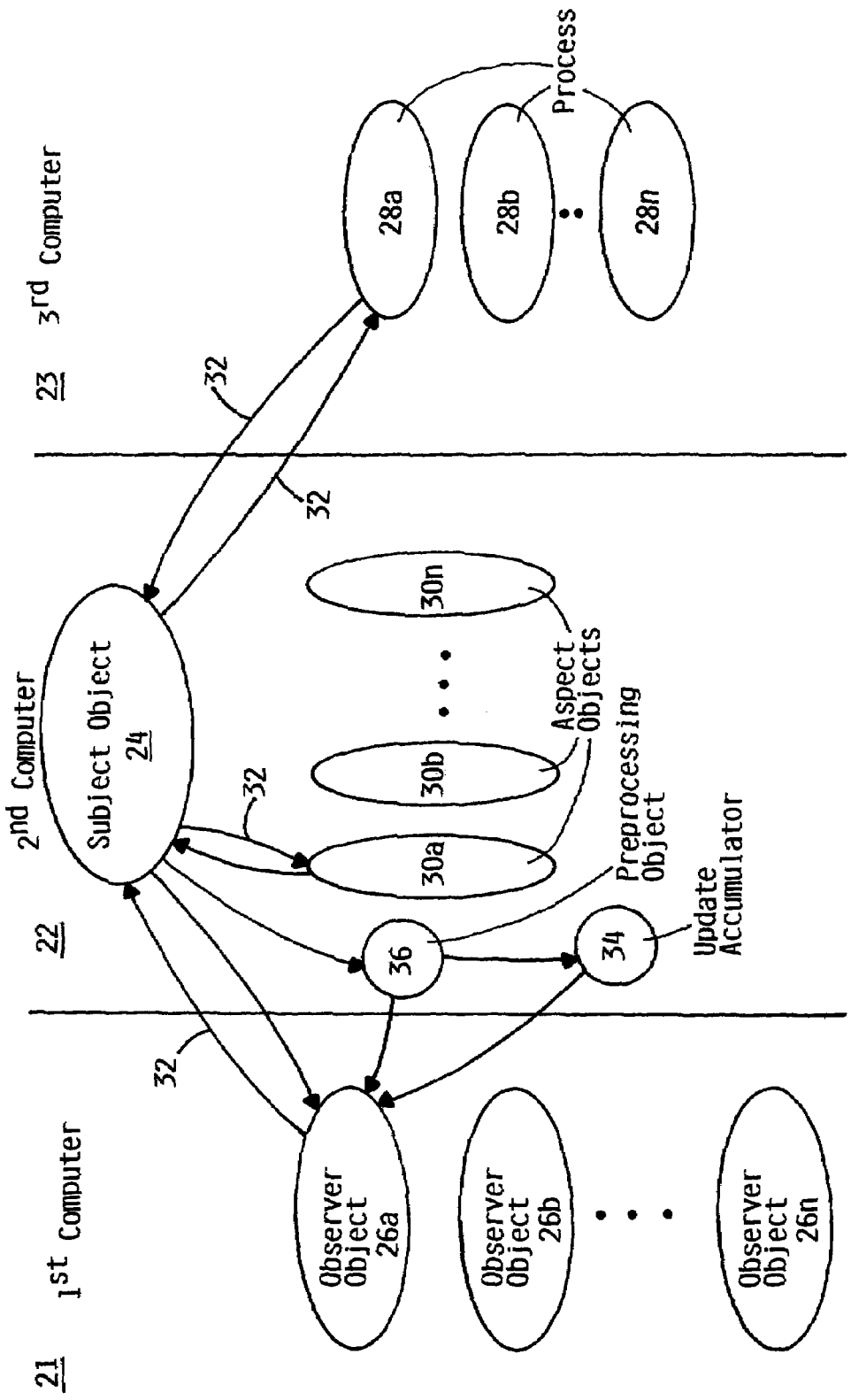
FIG. 2 is a object diagram of a subject/observer system, with some communication paths removed for clarity.

FIG. 2 is a schematic view of a distributed computer system embodiment 20. This embodiment comprises a first computer 21, a second computer 22, and a third computer 23. The first computer 21, the second computer 22, and the third computer 23 in this embodiment each comprise a computer 100 (FIG. 1). A plurality of observer objects 26a-26n ("observers") reside in the main memory 120 of the first computer 21; a subject object 24 ("subject"), a plurality of aspect objects 30a-30n ("aspects"), an update accumulator 34 ("accumulator"), and a preprocessing object 36 ("preprocessor") reside in the main memory 120 of the second computer 22; and a plurality processes 28a-28n reside in the main memory 120 of the third computer 23. FIG. 2 also shows a plurality of communication paths 32 that allow the subject 24, the observers 26a-26n, the aspects 30, the accumulator 28, the preprocessor 36, and the processes 28 to send messages to each other. Although only one set of communication paths 32 is shown in FIG. 2, those skilled in the art will recognize that similar communication paths 32 allow each observer 26 to send messages to the subject 24 and to one or more aspects 30.

In operation, each observer 26 creates one or more aspects 30 and attaches the aspects 30 to the subject 24 using a predefined set of attach/detach methods. These aspects 30 include information about what specific type of information the observer wants, what form the information should be sent, and how frequently the information should be sent. When the subject 24 changes its state, it produces an update message and sends the message to the attached aspects 30. If the update is the type that the observer 26 is interested, the aspect 30 sends a message to the subject 24 instructing it to send updated information to the observer 26. In some cases, this message may also instruct the subject 24 to send the message to the accumulator 34 until the observer 26 is ready to receive the update and/or to send the update to the preprocessor 36 for additional processing. This update method allows the observer 26 to throttle and/or narrow its scope of attachment to the subject 24.

Figure 3:
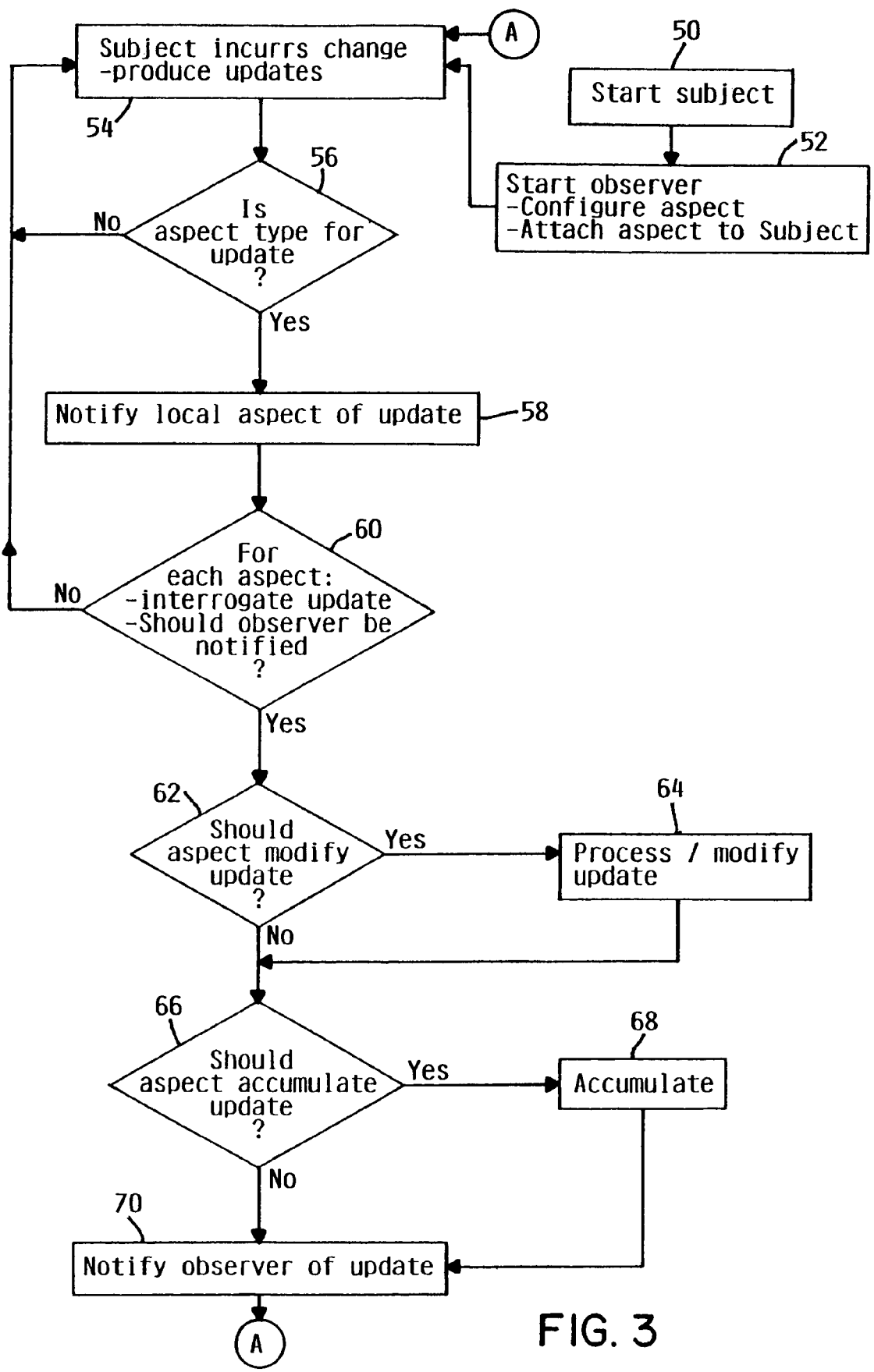
FIG. 3 is a process diagram of one update method embodiment.

FIG. 3 shows a block diagram of the embodiment depicted in FIG. 2. At block 50, the subject 24 begins operation. At block 52, the observer 26 begins operation and creates an aspect 30 (frequently residing in the subject's computer 22) containing certain configuration information. This configuration information may include, without limitation, what general type of updates of interest to the observer, the maximum frequency at which the observer can receive the updates, whether the subject's computer 22 should perform any preprocessing, and what form the observer 26 wants the data to be sent. The observer 26 then instructs the aspect 30 to attach itself to the subject 24. That is, the observer 26 sends a message to the aspect 30 instructing the aspect 30 to request that it be added to the subject's update list.

After this initial setup, the subject 24 begins normal operation. At block 54, the subject's state changes. At block 56, the subject 24 determines whether it should produce an update message in response to this particular type of state change. If this is the type of change for which the subject 24 produces an update message, the subject 24 (at block 58) sends the update to the attached aspects 30. At block 60, the notified aspects 30 interrogate the update message from the subject 24 and determine whether their corresponding observers 26 should be notified. The aspects 30 make this determination in this embodiment by comparing the information received from the interrogation of the message with the aspect's initial configuration information.

At block 62, the aspect 30 determines whether or not the update message needs preprocessing or other modification. Again, the aspect 30 makes this determination in this embodiment by comparing the information received from the interrogation of the update message with its initial configuration information. Representative modifications include, without limitation, encapsulating the update with Internet routing information, compressing the message, encrypting the message, calculating a related value, and filtering the information contained in the update.

Embodiments implementing the preprocessor 36 may be particularly desirable to reduce system bottlenecks. For example, in some embodiments, computer 22 may be a high-end "server" computer and whereas computer 21 may be a relatively inexpensive personal computer or a personal digital assistant. In these embodiments, preprocessing will allow the system 20 to shift part of the total computational load from computer 21 to computer 22. Embodiments using filtering and compression preprocessing may also be desirable for use in environments having limited transmission bandwidth, such as "wireless" and "pervasive" systems.

At block 66, the aspect 30 determines whether or not it should accumulate the update. In this embodiment, the aspect 30 compares how frequently updates have been sent to the observer 26 with the maximum communication rate specified in the initial configuration information. If the observer 26 is not ready for the update, the aspect 30 instructs the subject 24 to send the update to the accumulator 34 (at block 68). This accumulator 34 may be a simple "first-in-first-out" queue, or may use a more advanced algorithm to prioritize the updates. At block 70, the aspect 30 instructs the subject 24 to send the update to the observer 26. The subject 24 then waits for the next state change (block 54).

The observer 26 can update the configuration information, such as with a real-time system load indication, at any time during the update method depicted in FIGS. 2 and 3. In some embodiments, the observer 26 may update the configuration information by sending a message containing the updated information to the appropriate aspect 30. In other embodiments, the observer 26 terminates the aspect 30, creates a new aspect 30' (not shown), and instructs the new aspect 30' to attach itself to the subject 24. Other methods of updating the configuration information are also within the scope of the present invention.

In one exemplary embodiment, the observers 26 are graphical user interfaces and the subject 24 is a single server's activity. The aspects 30 in this embodiment would filter events based on need and processing capacity. More specifically, the graphical interface observer(s) that are only interested in overall status would define an aspect 30 to select only status events that affect overall status and effectively filter out detailed output. Similarly, the graphical interface observer(s) designed to display all of the subject's detailed output could specify two aspects: one to select overall status events, and one that accumulates detailed output until the observer 26 is able to process them as a single event.

In the Java programming language ("Java"), the set of attach/detach methods in this example can be defined within an interface "Observable" (named here for convenience). To support the aspect extension, the subject 24 maintains a two-dimensional list: a list of observers 26 and, for each observer 26, a list of aspects 30 associated with that observer 26. Again, within Java, this support can easily be encapsulated within an additional class "ObserverList" (named here for convenience) that is a vector of vectors.

Continuing the example, the observer 26 implements an update method that enables the subject notification. Once again, within Java, this method can be defined within an interface "Notifiable" (named here for convenience). Given the aspect extension to the attach/detach methods, the observer 26 is enabled to define and dynamically control the aspect(s) 30 that the observer 26 is registered with against the subject 24. The aspect 30, in turn, is able to filter, throttle, change or exchange the data to be notified from the subject 24.

To minimize remote calls, the subject 24 in this example, upon undergoing a state change, produces a specific type of event, which contains the state change to be passed as a parameter on the observer update call. This event, and the data contained within it, can be architected any number of ways in terms of type and size. Once the notification event is produced, the subject processes through the two-dimensional list of observers 26 and aspects to identify those aspects 30 that are configured to react to this event type. The subject 24 then presents the event to the aspect 30 for local examination. The observer 26 controlled aspect utilizes its settings, configuration or cached data to determine if, when and what event it's paired observer 26 should be notified. This processing and interaction with aspects in this example is encapsulated within and delegated to the fore mentioned ObserverList class by the subject.

Referring again to FIG. 1, the processor 110 in the computer 100 may be constructed from one or more microprocessors and/or integrated circuits. Processor 110 executes program instructions stored in main memory 120. Main memory 120 stores programs and data that processor 110 may access. When computer system 100 starts up, the processor 110 initially executes the program instructions that make up the operating system 124. Operating system 124 is a sophisticated program that manages the resources of computer system 100. Some of these resources are the processor 110, the main memory 120, the mass storage interface 130, the input/output interface 140, the network interface 150, and the system bus 160.

Although computer 100 is shown to contain only a single processor 110 and a single system bus 160, those skilled in the art will appreciate that the computer 100 may have multiple processors 110 and/or multiple buses 160. In addition, the interfaces may also each include a separate, fully programmed microprocessor. These embodiments may be desirable because the interface processors can off-load compute-intensive processing from processor 110. However, those skilled in the art will appreciate that the present invention applies equally to computers 100 that simply use I/O adapters to perform similar functions.

The I/O interface 140 directly connects the system bus 160 to one or more I/O devices 165, such as a keyboard, mouse, or cathode ray tube. Note, however, that while the I/O interface 140 is provided to support communication with one or more I/O devices 165, some computer 100 embodiments do not require an I/O device 165 because all needed interaction with other computer 100 (and their objects 135) occurs via network interface 150.

The network interface 150 is used in this embodiment to connect other computers and/or devices to computer 100 across a network 170. The present invention applies equally no matter how computer 100 may be connected to other computers and/or devices, regardless of whether the network connection 170 is made using present-day analog and/or digital techniques or via some networking mechanism of the future. In addition, many different network protocols can be used to implement the communication between computers 100. One suitable network protocol is the Transmission Control Protocol/Internet Protocol ("TCP/IP").

The mass storage interface 130 in this embodiment directly connects the system bus 160 to one or more mass storage devices 155. The mass storage devices 155, in turn, may be any apparatus capable of storing information on and/or retrieving information from a mass storage medium 195. Suitable mass storage devices 155 and mediums 155 include, without limitation, hard disk drives, CD-ROM disks and drives, DVD disks and drives, tapes and tape drives, and the like. Additionally, although the mass storage device 155 is shown directly connected to the system bus 160, embodiments in which the mass storage device 155 is located remote from the computer 100 are also within the scope of the present invention.

One suitable computer 100 is an enhanced AS/400® running the OS/400® multitasking operating system, both of which are produced by International Business Machines Corporation of Armonk, N.Y. However, those skilled in the art will appreciate that the mechanisms and apparatus of the present invention apply equally to any computer system and operating system, regardless of whether the computer system is a complicated multi-user computing apparatus or a single workstation.

Although the present invention has been described in detail with reference to certain examples thereof, it may be also embodied in other specific forms without departing from the essential spirit or attributes thereof For example, the present invention may be implemented on implemented, in whole or in part, on pervasive devices, such as cellular phones, personal digital assistants, and the like. Those skilled in the art will appreciate that the bandwidth reduction and processor workload shifting features of the present invention may be particularly desirable in these embodiments. The present invention is also capable of being distributed as a program product in a variety of forms, and applies equally regardless of the particular type of signal bearing media used to actually carry out the distribution. Examples of suitable signal bearing media include: recordable type media, such as floppy disks and CD-RW disks, CD-ROM, DVD, and transmission type media, such as digital and analog communications links. Additionally, the present invention can be used multiple times within a single distributed system 20. Thus, for example, the subject 24 may function as an observer 26 of the processes 28.

The present invention offers numerous advantages over conventional update methods. For example, the aspect design pattern extension offers multiple, flexible, extendible subject/observer relationships. These observer controlled relationships easily facilitate filtering and throttling of updates while maintaining the desired data consistency. The benefits of these extensions are magnified in systems where communication costs are high, such as distributed and pervasive systems. The aspect list allows some embodiments to handle a wider variety of types. This represents a dramatic shift from conventional subject/observer implementations where, given a specific state change, the subject controls what and how often to notify each observer regardless of the desired observer relationship.

The accompanying figures and this description depicted and described embodiments of the present invention, and features and components thereof It is desired that the embodiments described herein be considered in all respects as illustrative, not restrictive, and that reference be made to the appended claims for determining the scope of the invention.

We claim:

1. A computer-implemented method of communicating updates from a subject to an observer, comprising:
   in an observer, creating an aspect object, the aspect object comprising logic adapted selectively communicate update information from a subject to the observer based on configuration information, the configuration information comprising an attribute of the observer;
   attaching the aspect object to the subject;
   notifying the aspect object of an update;
   in the aspect object, interrogating the update to generate to generate the update information; and
   selectively communicating the update information to the observer based on a comparison between the update and the configuration information.

2. The computer-implemented method of claim 1, further comprising selectively modifying the update information based on a comparison between the update and the configuration information.

3. The computer-implemented method of claim 1, further comprising selectively accumulating the update information based on the configuration information.

4. The computer-implemented method of claim 1, further comprising sending updated configuration information from the observer to the aspect object, wherein the updated configuration information comprises an updated attribute of the observer.

5. The computer-implemented method of claim 4, wherein the updated attribute of the observer includes a system load indication.

6. The computer-implemented method of claim 1, wherein subject comprises an object and wherein the observer comprises an object.

7. The computer-implemented method of claim 1, wherein the configuration information comprises a type of updates desired indication.

8. The computer-implemented method of claim 7, wherein the aspect object selectively discards the update information in response to the type of updates desired indication.

9. The computer-implemented method of claim 1, wherein the attribute of the observer includes a maximum desired communication rate indication.

10. The computer-implemented method of claim 9, further comprising an accumulating the update information if a required communication rate is greater than the maximum desired communication rate indication.

11. The computer-implemented method of claim 1, further comprising preprocessing the update to selectively modify the update information in response to the configuration information.

12. The computer-implemented method of claim 11, wherein the preprocessing comprises encapsulating the update with Internet routing information.

13. The computer-implemented method of claim 11, wherein the preprocessing comprises compressing the message.

14. The computer-implemented method of claim 11, wherein the preprocessing comprises encrypting the message.

15. The computer-implemented method of claim 11, wherein the preprocessing comprises calculating a related value.

16. The computer-implemented method of claim 1, further comprising, in the subject, providing a set of attach/detach methods that enable the observer to attach the aspect object to and detach the aspect object from the subject.

17. A computer-implemented method of maintaining data consistency between a subject object on a first computer system and an observer object on a second computer system, comprising:
   1) by an observer object, creating an aspect object, the aspect object comprising logic adapted selectively communicate update information from a subject object to the observer based on configuration information, the configuration information comprising a desired type indicator and a desired communication rate indicator;
   b) attaching the aspect object to the subject object; and
   c) in response to a state change indication from the subject object:
      1) sending an update to the aspect object;
      2) by the aspect object, interrogating the update to generate an update type indicator;
      3) by the aspect object, modifying the update based on a comparison between the update type indicator and the desired type indicator to produce a modified update;
      4) by the aspect object, sending the modified update to an accumulator;
      5) by the aspect object, using the desired communication rate indicator to determine whether the object is ready to receive the modified update; and
      6) communicating the modified update to the observer.

* * * * *